United States Patent
Sharma

(10) Patent No.: US 7,080,309 B2
(45) Date of Patent: Jul. 18, 2006

(54) MULTIPLE ECC SCHEMES TO IMPROVE BANDWIDTH

(75) Inventor: Debendra Das Sharma, Santa Clara, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 15 days.

(21) Appl. No.: 10/615,532

(22) Filed: Jul. 7, 2003

(65) Prior Publication Data

US 2004/0030980 A1    Feb. 12, 2004

Related U.S. Application Data

(63) Continuation of application No. 09/562,135, filed on May 1, 2000, now Pat. No. 6,675,344.

(51) Int. Cl.
   *G06F 11/10* (2006.01)
(52) U.S. Cl. ........................... 714/763; 714/776
(58) Field of Classification Search ................ 714/763, 714/776, 758, 774
   See application file for complete search history.

(56) References Cited

U.S. PATENT DOCUMENTS

| | | | | |
|---|---|---|---|---|
| 4,631,725 A * | 12/1986 | Takamura et al. | ........... | 714/752 |
| 4,692,917 A * | 9/1987 | Fujioka | ........... | 370/392 |
| 4,852,100 A * | 7/1989 | Christensen et al. | ........... | 714/763 |
| 4,905,242 A * | 2/1990 | Popp | ........... | 714/773 |
| 5,010,553 A * | 4/1991 | Scheller et al. | ........... | 714/751 |
| 5,488,694 A * | 1/1996 | McKee et al. | ........... | 710/4 |
| 5,555,250 A * | 9/1996 | Walker et al. | ........... | 714/763 |
| 5,555,382 A * | 9/1996 | Thaller et al. | ........... | 710/113 |
| 5,740,188 A * | 4/1998 | Olarig | ........... | 714/763 |
| 5,764,924 A * | 6/1998 | Hong | ........... | 710/300 |
| 5,944,843 A * | 8/1999 | Sharma et al. | ........... | 714/701 |
| 6,014,720 A * | 1/2000 | Wang et al. | ........... | 710/307 |
| 6,038,693 A * | 3/2000 | Zhang | ........... | 714/768 |
| 6,463,506 B1 * | 10/2002 | McAllister et al. | ........... | 711/118 |
| 6,469,520 B1 * | 10/2002 | Arguelles-Paneda | ........... | 324/625 |
| 6,675,344 B1 * | 1/2004 | Sharma | ........... | 714/763 |
| 6,697,984 B1 * | 2/2004 | Sim et al. | ........... | 714/751 |
| 6,738,578 B1 * | 5/2004 | Mihota | ........... | 398/22 |
| 6,807,684 B1 * | 10/2004 | Lewis | ........... | 2/243.1 |
| 6,850,519 B1 * | 2/2005 | Saito et al. | ........... | 370/389 |

* cited by examiner

*Primary Examiner*—Stephen M. Baker

(57) ABSTRACT

A method and an apparatus are used to maximize available transmission bandwidth by using multiple error correcting code (ECC) schemes. A transaction between components in a computer system may involve the transmission of header information in a header packet. One or more separate data packets may then be used to transmit other data, depending on the particular transaction and the transmission bandwidth. Using a multiple ECC scheme, the header packet and transactions with a small number of data packets may be protected using one type of ECC. The data packets part of a large transaction with a large number of data packets may be protected by another compact ECC, thus significantly reducing the ECC overhead, and improving transmission bandwidth. To reduce data latency, parity bits may be distributed with each of the data packets, with the remaining ECC bits included in the last data packet. Alternatively, an ECC may be used where the parity bits for data bits in a packet are with their respective data packets and the remaining ECC bits are sent on one or more data packets. This arrangement allows early detection of single bit errors in a specific data packet, and thus reduces latency.

18 Claims, 8 Drawing Sheets

-- PRIOR ART --

| HEADER | 0 | 75 | | 22 | 21 ECC 1 | 0 |
|---|---|---|---|---|---|---|
| DATA | 1 | 75 | | | | 0 |
| DATA | 2 | 75 | | | | 0 |
| DATA | 3 | 75 | | | | 0 |
| DATA | 4 | 75 | | | | 0 |

*Fig. 4A*

| 75 | ECC 2 | 22 | 21 ECC 1 | 0 |
|---|---|---|---|---|
| | ECC 2 | | | |
| | ECC 2 | | | |
| | ECC 3 | | | |
| | ECC 3 | | | |
| | ECC 3 | | | |

*Fig. 4B*

MULTIPLE ECC SCHEMES TO IMPROVE BANDWIDTH

CROSS REFERENCE TO RELATED APPLICATION

This is a continuation of application No. 09/562,135 filed on May 1, 2000, now U.S. Pat. No. 6,675,344 which is hereby incorporated by reference herein.

TECHNICAL FIELD

The technical field is computer and networking systems that implement error correcting code schemes.

BACKGROUND

Modern computer systems use various interconnection mechanisms to allow communications between various components of the computer system. In a multi-computer system, central processing units or the interconnect chipsets may communicate with one another through various defined transactions such as a fetch request, a data return, and a snoop request, for example. Transactions may be sent in each interconnect using a protocol format defined by the specification for that interconnect. Such a transaction may include one or more packets. Different transactions may need different packet lengths. For example, a number of packets required to send a fetch request may be less than a number of packets required to send a cache line data return. A packet is the basic unit of data transmission and includes a number of cycles of data transfer in the interconnect structure.

Most interconnect structures provide a form of error detection and/or correction. An error correcting code (ECC) and associated circuit gives the computer system the ability to tolerate various anticipated errors and to provide a high degree of reliability during data transmission. One approach to implementing an ECC is to provide the ECC at the packet level such that each packet is independently protected by the underlying ECC for anticipated failures.

Error correction codes have been developed that both detect and correct certain errors. One well known class of ECC algorithm is the "Hamming codes," which are widely used for error detection and correction in digital communications data storage systems. The SEC-DED Hamming code is capable of detecting double bit errors and correcting single bit errors. A detailed description of the Hamming codes is found in Shu Lin et al., "Error Control Coding, Fundamentals and Applications," Chapter 3 (1982). Another well known ECC algorithm is the "Reed-Solomon code" widely used for error correction in the compact disk industry. A detailed description of this ECC algorithm is found in Hove et al., "Error Correction and Concealment in the Compact Disk System," Philips Technical Review, Vol. 40, No. 6, pp. 166–172 (1980). The Reed-Solomon code is able to correct multiple errors per word. Other conventional ECC algorithms include the b-adjacent error correction code described in D. C. Bossen, "B-Adjacent Error Correction," IBM J. Res. Develop., pp. 402–408 (July 1970), and the odd weight column codes described in M. Y. Hsiao, "A Class of Optimal Minimal Odd Weight Column SEC-DED Codes," IBM J. Res. Develop., pp. 395–400 (July 1970). The Hsiao codes, like the Hamming codes, are capable of detecting double bit errors and correcting single bit errors. The Hsiao codes use the same number of check bits as the Hamming codes (e.g., 8 check bits for 64 bits of data), but are superior in that hardware implementation is simplified and speed of error detection is improved.

Use of an ECC imposes an overhead on each transaction. The extra overhead required to implement the ECC reduces bandwidth available for data transmission and other functions.

SUMMARY

A method and an apparatus are used to maximize available transmission bandwidth by using multiple error correcting code (ECC) schemes. A transaction between components in an interconnected computer system may involve the transmission of header information in a header packet. One or more separate data packets may then be used to transmit other information, depending on the particular transaction and the interconnection buswidth. For example, a cache line data return transaction may involve transmission of 64 bytes of cache line data (i.e., 512 data bits). The transmission bus width may be 76 bits wide. Using a multiple ECC scheme, the header packet may be protected using a standard SEC-DED code of eight ECC bits. The data packets may be combined and protected by a single ECC code of eleven bits, thus significantly reducing the ECC overhead, and improving available data bandwidth.

To reduce data latency, parity bits may be distributed with each of the data packets, with the remaining ECC bits included in the last data packet. In an alternative embodiment, the remaining ECC bits may be placed anywhere in the transaction. This arrangement allows early detection of single bit errors in a specific data packet, and thus reduces latency.

DESCRIPTION OF THE DRAWINGS

The detailed description will refer to the following drawings in which like numerals refer to like objects, and in which:

FIGS. 4A and 4B illustrate alternative multiple ECC schemes; and

DETAILED DESCRIPTION

Error correcting code (ECC) circuits are widely used in storage and interconnections to correct certain types of errors and to detect multiple-bit errors. One common ECC code is the SEC-DED (single error correction—double error detection) code. Other ECC codes are capable of detecting more than two errors and correcting more than single errors.

The ECC circuits perform their error checking functions by generating a number of check bits for a specific number of data bits, and then writing the check bits to storage with the data bits, or sending the check bits with data bits in an interconnection system. The check bits are then used during subsequent read-write cycles or other memory accesses to verify the correct values for the data bits. In a data transmission system, the check bits would be checked at a receiving node. The number of check bits required to implement the ECC depends on the number of data bits being read. As shown in Table 1, as a number of data bits being read increases, the number of required ECC bits also increases.

TABLE 1

| Data Bits | ECC Bits for SEC-DED Code |
|---|---|
| 16–31 | 6 |
| 32–63 | 7 |
| 64–1127 | 8 |
| 128–255 | 9 |

Hardware to implement ECC bits includes an ECC generator (an ECC encoder and decoder). The ECC encoder generates the required check bits and appends the check bits to the packet to be protected. Referring to Table 1 above, eight ECC bits are required to be generated to protect a packet of 64 bits, for example. The ECC decoder is used to generate the ECC bits and to perform the error correcting/detecting code operations including checking the data bits during read and write (or transmit and receive) operations. As is obvious from Table 1 using an ECC means a large percentage of the available transmission bandwidth is devoted to transmission of the ECC bits.

An improved ECC scheme achieves error correction/detection in a more efficient manner than existing packetized ECC schemes. In particular, the ECC scheme determines a number of ECC bits based on aggregating all data of a particular transaction together.

Figure 1:
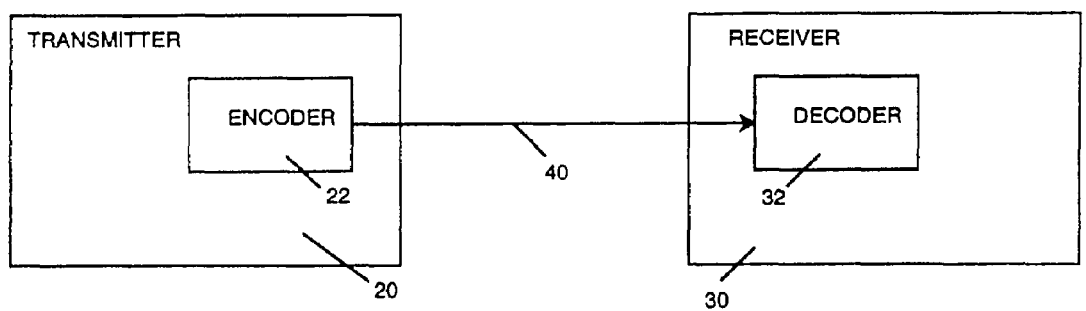
FIG. 1 is a block diagram of a system that uses an error correcting code (ECC)

FIG. 1 illustrates a current system for applying an ECC to a transaction in a computer system. In FIG. 1, a computer system 10 includes a transmitter 20 that communicates with a receiver 30 through a bus 40. The transmitter 20 includes an encoder 22 that applies an ECC to data packets being sent to the receiver 30. The receiver 30 includes a decoder 32 that decodes the encoded transmission. As shown in the example of FIG. 1, the bus 40 is 38 bits wide. A packet includes two cycles worth of transmission over the bus 40. That is, a packet includes 76 bits of data. If the objective of using an ECC scheme is to correct single-bit errors, detect all double-bit errors, and detect any wire stuck-at-failure, a standard (76, 68) SEC-DED Hamming code may be used. Thus, 68 bits of data are sent over the bus along with 8 ECC bits, for an ECC overhead of 10.5 percent.

Figure 2:
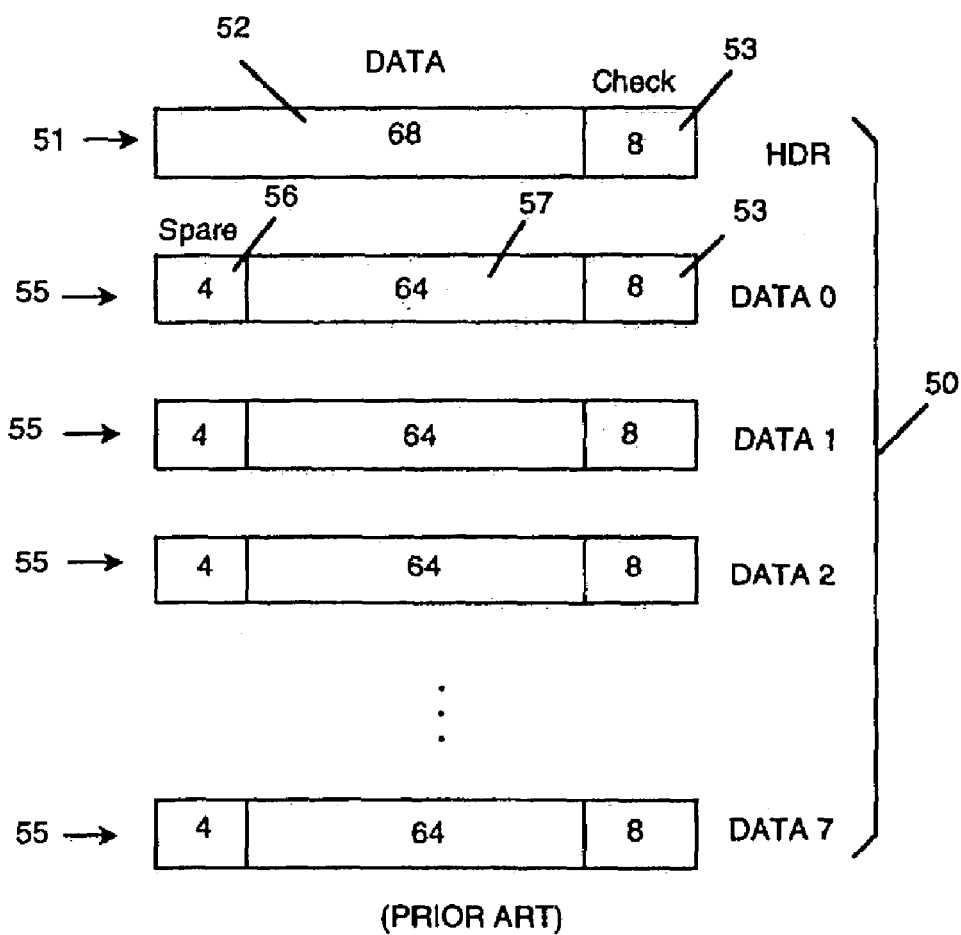
FIG. 2 illustrates an ECC scheme using the system of FIG. 1.

FIG. 2 illustrates application of a current ECC scheme to a large data transmission, such as a data_priv transaction 50. A data_priv transaction is a cache line data return to a cache that requested the data. The ECC may be a SEC-DED code, for example. In FIG. 2, the transmission bandwidth is 76 bits, and the data transmission requires transmission of 512 bits of data. With a header and the required ECC bits, a total of 9 packets of data are transmitted over 9 cycles. Each packet of data includes the same number of check bits. The transaction 50 includes a header packet 51 and eight data packets 55. Each of the nine packets (51 and 55) include eight ECC, or check, bits 53. The header packet 51 includes a data section 68, which contains command, address, transaction identifier information and other information. The data packets include 64-bit data sections 57, leaving four-bit spare section 56. The spare bits may be used for flow control purposes, for example. Counting all the ECC bits used to protect the data packets results in an ECC overhead for this transaction of 12.5 percent.

Figure 3A:
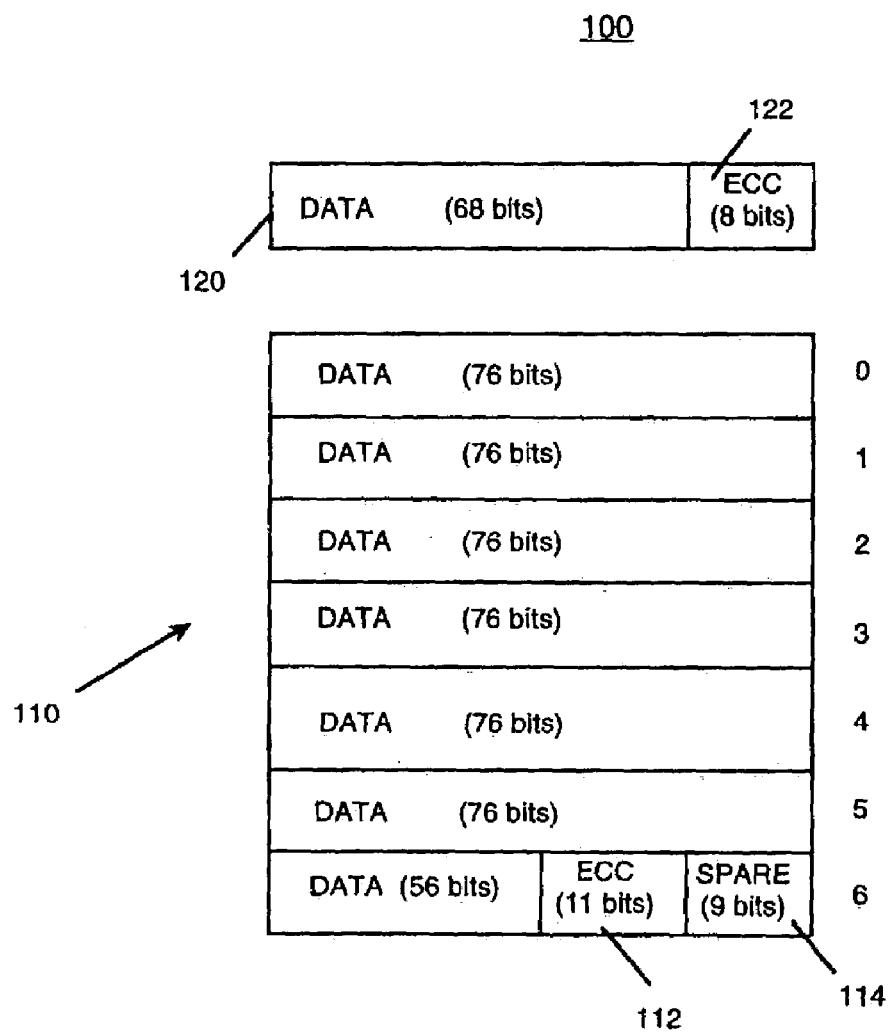
FIGS. 3A and 3B illustrate multiple ECC schemes.

To reduce the bandwidth penalty inherent in current ECC schemes, a multiple ECC scheme applies ECC bits to transmission packets based on the data arrangements within the packets. Returning to the example of the data_priv transaction, FIG. 3A shows an application of the multiple ECC scheme. A data_priv transaction 100 includes 512 data bits that may be arranged in data packets 110. Accompanying the data bits is a header 120, which is the same as the header 51 in FIG. 2. The header uses the standard SEC-DED code, and thus requires eight ECC bits 122. The data packets 110 are arranged so that the 512 data bits fill the first six data packets 10 with the remaining data bits in the seventh data packet 110. Because the data bits total 512, only eleven ECC bits 112 are required to be appended to the data packets 110, and all eleven ECC bits are appended to the seventh data packet. Nine spare bits 114 are also available. The ECC overhead is now reduced to only about 2 percent.

One drawback of the multiple ECC scheme shown in FIG. 3A is that all data packets 110 must be received before the ECC bits are available for decoding and error correction/detection purposes. That is, the data in the data_priv transaction 100 cannot be used until the entire transaction is received. Despite this drawback, the multiple ECC scheme illustrated in FIG. 3A may be useful for interconnects to input/output (I/O) devices, for example, where bandwidth is more important than latency. The multiple ECC scheme illustrated in FIG. 3A may also be used for other devices if a way exists to process the data as it is received without committing to the results until the entire transaction is received and the error correction/detection process is completed. For example, data processing may proceed without writing to memory until the error correction/detection process is completed. In the example illustrated in FIG. 3A, if a correction is required, the processing pipeline may be flushed and the data processing redone. If an uncorrectable error is detected, then error recovery procedures may be invoked.

Figure 3B:
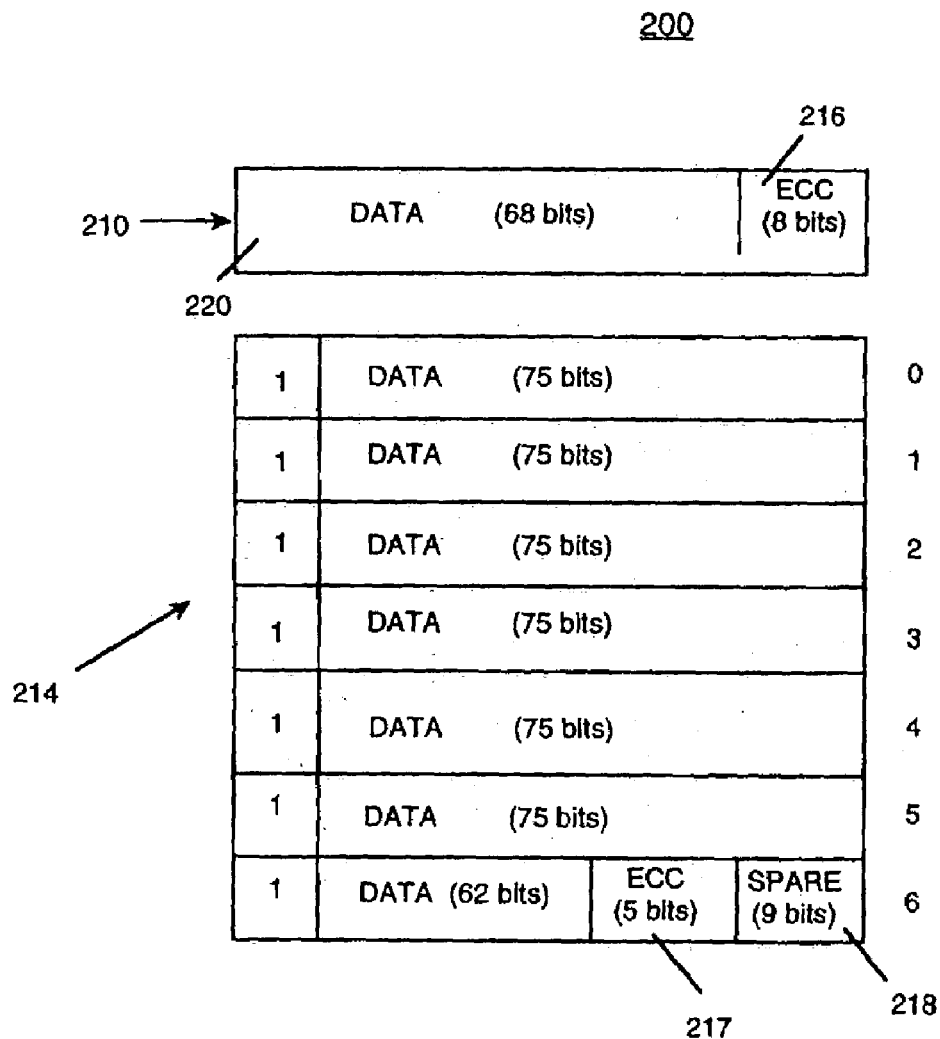

To further improve on the multiple ECC scheme shown in FIG. 3A, extra bits in the data packets may be used as parity bits. FIG. 3B illustrates an example of a data_priv transaction 200 that incorporates a multiple ECC scheme and parity bits. A header 210 includes a data section 212 and an ECC section 216. A data section 220 includes seven data packets, each with a parity bit. The ECC section includes 11 ECC bits to protect the (512 data+7 parity) bits using the a standard SEC-DED code. The seven data packets 220 include the 512 data bits for the data priv transaction 200. Each of the first six data packets 220 includes 75 data bits, and the seventh data packet 220 includes 62 data bits. The sixth data packet 220 also includes an ECC section 217 having 11 ECC bits and a spare section 218 having 1 bit.

Appended to each of the data packets 220 is a parity bit section 214 having one parity bit. Thus, the parity bits in the first six packets protect 75 bits of data and in the seventh packet, protects 62 bits of data. Upon receipt of a particular data packet 220, the parity bit may be checked. If the parity bit does not indicate an error, then the data packet 220 will not contain any single-bit errors, and may only contain multiple (uncorrectable but detectable) errors. If the parity bit indicates an error, than a processing stall may be invoked until the entire transaction is received so that any single-bit errors may be corrected by the ECC before processing the data. Thus, the ECC scheme illustrated in FIG. 3B retains the same minimal ECC overhead as the multiple ECC scheme illustrated in FIG. 3A, but at least partially eliminates the data latency problem.

A further example of a multiple ECC scheme may be illustrated with reference to a cache line data return. Such a cache line data return may include one header packet followed by eight data packets if the same SEC-DED ECC scheme as used for all packets. This data return transaction would then require nine packets. Using a multiple ECC scheme, the header packet would retain the SEC-DED code but a different ECC code could be used for the data packets. For example, a regular (523, 512) SEC-DED Hsiao code could be used for the SEC-DED requirement. For wire failure detection, a modulo 4 counter may be used, protected with an (8, 4) SEC-DED code. The result is a (531, 512) code that achieves the desired single error correction/double error detection, and the data and accompanying ECC code may be transmitted in seven packets instead of eight packets as would be required using the conventional approach.

The example illustrated above involved the use of two ECC codes. However, the multiple ECC scheme is not limited to two ECC codes, such as one ECC code for the data transmission, and another ECC code for the remainder of the transmission. More than two ECC codes may be used for a transaction depending on the transaction and the components involved. In addition, the use of multiple ECCs is not restricted to packetized data. Any communication or data transmission may use the multiple ECC schemes.

FIGS. 4A and 4B illustrate alternative multiple ECC schemes. In FIG. 4A, a header packet includes vital information in bits 0–21, and is protected by a first ECC. The remaining information in the header packet and four data packets are protected by a second ECC. That is, data bits 22–75 in the header packet, and data bits 0–75 in the data packets, are protected by the second ECC.

FIG. 4B illustrate the use of more than two ECCs. In FIG. 4B, a first ECC is used to protect bits 0–21 in a first line, a second ECC is used to protect bits 22–75 in the remainder of the first line and in lines 1 and 2, and a third ECC is used to protect the remaining data in the transaction.

Figure 5A:
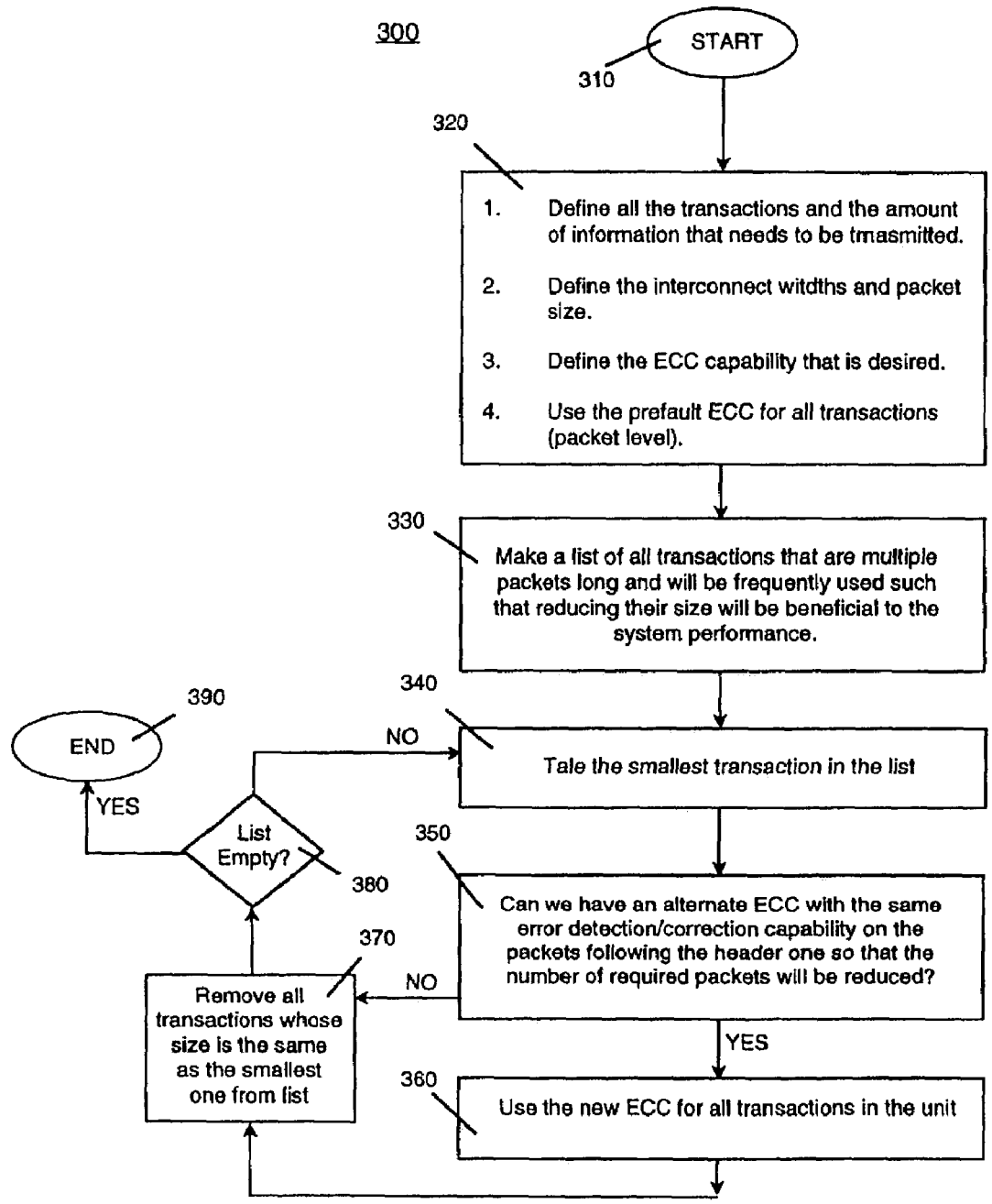
FIGS. 5A–5C are flowcharts illustrating processes using the ECC schemes of FIGS. 3A and 3B.
Figure 5B:
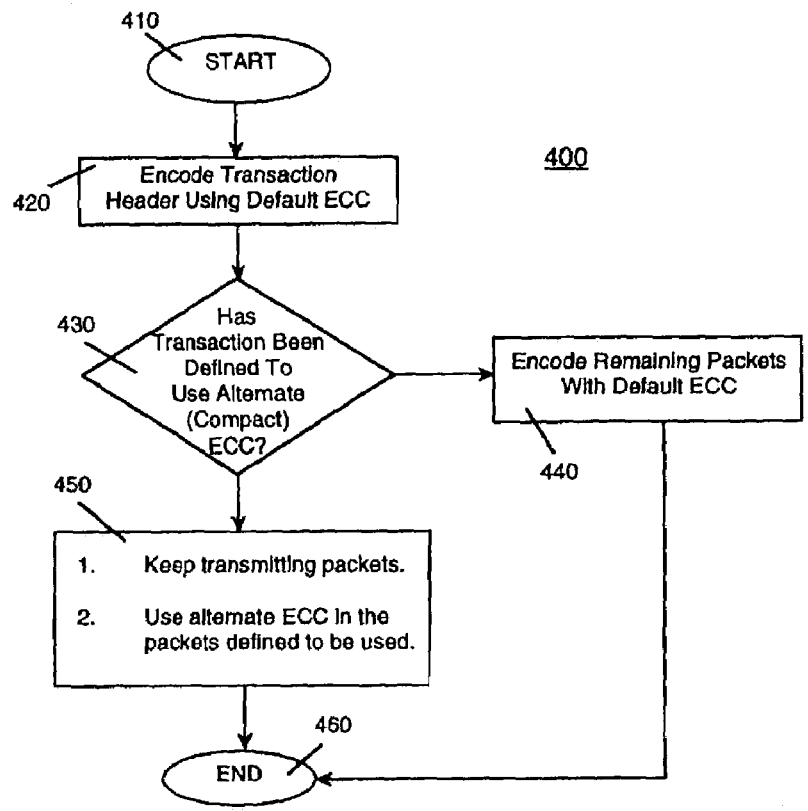
Figure 5C:
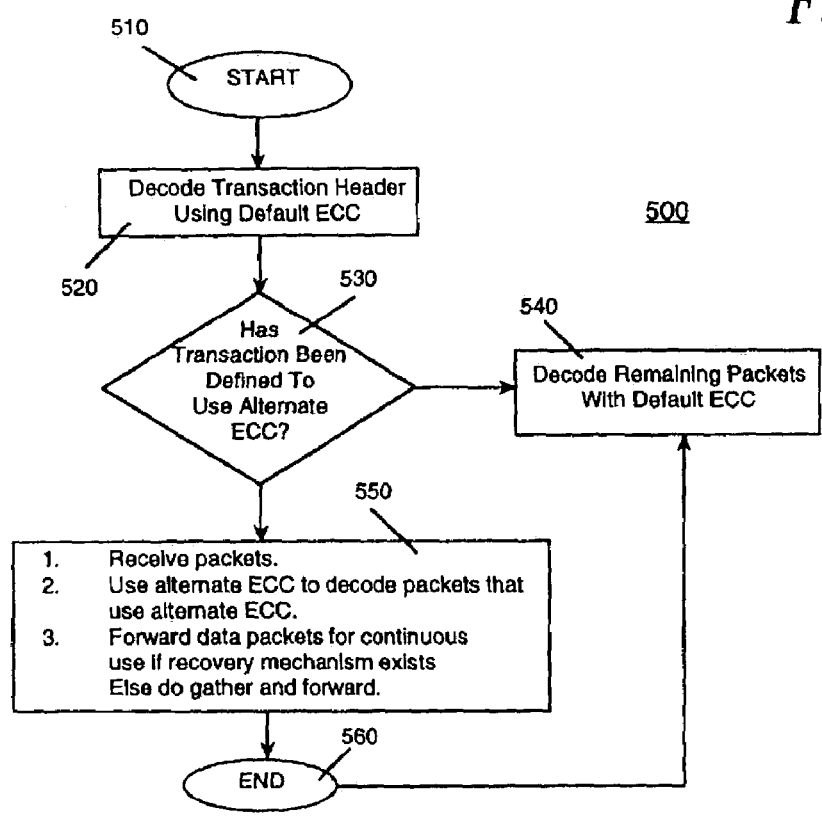

FIGS. 5A–5C are flowcharts illustrating process using the ECCs of FIGS. 3A–4B.

FIG. 5A illustrates a process 300 for determining a multiple ECC scheme. The process 300 starts at 310. In block 320, all transactions are defined and the amount of information needed to be transmitted is determined. Next, the interconnect widths and packet sizes are determined. The desired ECC capability is then defined. A default ECC may be used for all transactions at the packet level.

In block 330, a list is made of all transaction that are multiple packets long and that will be frequently used such that reducing their size may be beneficial to system performance.

In block 340, the smallest transaction form the list is selected. In block 350, a determination is made to see if one or more alternate ECCs with the same error detection/correction capability are available for the packets following the header packet so that the total number of packets may be reduced. These alternative ECCs (other than the default packet level ECC) may be applied to long and frequent transactions.

If the alternate ECC is available, the process moves to block 360, and the alternate ECC is used for all transactions on the list of transactions. If the alternate ECC is not available, the process moves to block 370 and all transactions whose size is the same as the smallest transaction are removed form the list of transactions. In block 380, the list is checked to see if it is empty. If the list is empty, the process moves to block 390 and ends. Otherwise, the process returns to block 340.

FIG. 5B illustrates a process 400 for encoding an ECC. The process begins at block 410. In block 420, the encoder encodes the transaction using a default ECC. In block 430, a determination is made if the transaction has been determined to use an alternate (compact) ECC. If the alternate ECC is not to be used, the process moves to block 440, and the remaining portions of the transaction are encoded using the default ECC. The process then moves to block 460 and ends. If the alternate ECC is to be used, the process moves to block 450, the packets are transmitted, and are encoded using the alternate ECC. The process then moves to block 460 and ends.

FIG. 5C is a block diagram illustrating a decoding process 500. The process 500 begins at block 510. In block 520, the transaction header is decoded using the default ECC. In block 530, a determination is made if any portion of the transaction has been defined to use the alternate ECC. If not portion has been defined to use the alternate ECC, the process moves to block 540 and the remaining transaction is decoded using the default ECC. If the alternate ECC has been defined, the process moves to block 550, where the packets are received and the alternate ECC is used to decode the packets. The data packets may then be forwarded for continuous use. In block 550, the process ends.

Figure 6:
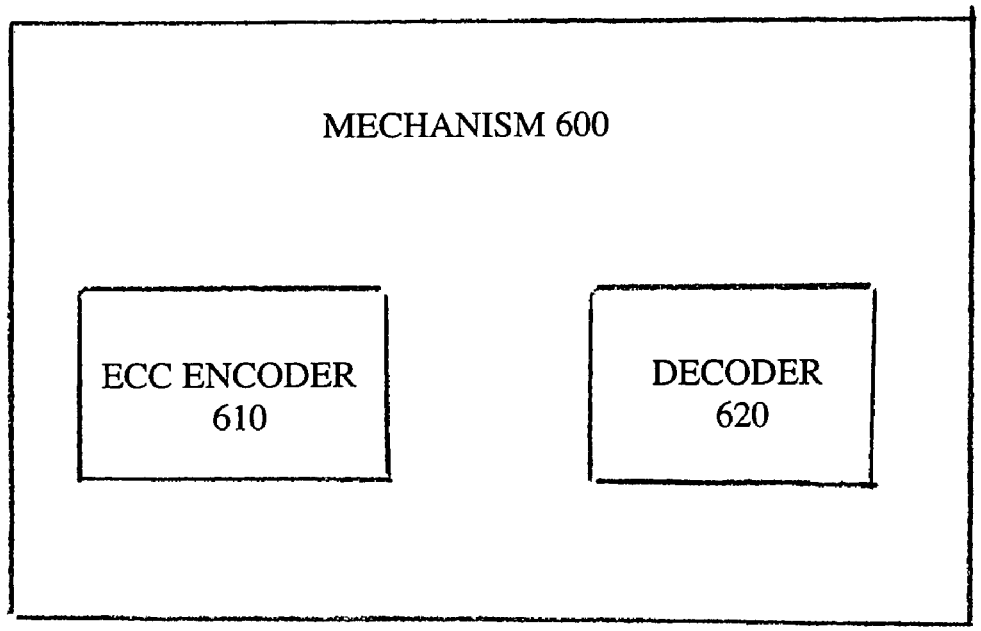
FIG. 6 is a block diagram of a multiple error correcting code (ECC) mechanism for use with transactions with a computer system, according to one embodiment of the present invention.

FIG. 6 is a block diagram of a multiple error correcting code (ECC) mechanism for use with transactions with a computer system, according to one embodiment of the present invention. The multiple ECC mechanism 600 includes an ECO encoder 610 and a decoder 620. The ECC encoder 610 can apply a first ECC code to a first portion of a transaction and a second ECC code to a second portion of the transaction, for example according to various embodiments described herein. The first portion of the transaction can be a header packet and the second portion of the transaction can be one or more data packets, according to various embodiments described herein. The decoder 620 can decode the first and the second ECC codes, for example according to various embodiments described herein.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A multiple error correcting code (ECC) mechanism for use with transactions in a computer system, comprising:
    an ECC encoder, the ECC encoder applying a first ECC code to a first portion of a transaction and a second ECC code to a second portion of the transaction; and
    a decoder that decodes the first and the second ECC codes, wherein the first portion of the transaction is a header packet, wherein the second portion of the transaction comprises one or more data packets and wherein all of the data packets do not require an associated ECC code.

2. The mechanism of claim 1, wherein the second ECC code is contained in a last data packet of the one or more data packets.

3. The mechanism of claim 1, wherein the second ECC code comprises a plurality of parity bits and one or more remaining ECC bits, wherein each data packet of the one or more data packets includes one parity bit of the plurality of parity bits, wherein a last data packet of the one or more data packets includes the one or more remaining data bits, and wherein data may be processed without waiting for all of the one or more packets to be received if no parity bit errors exist.

4. The mechanism of claim 1, wherein the second ECC code is a SEC-DED code.

5. The mechanism of claim 1, wherein the second ECC code detects a wire failure.

6. The mechanism of claim 1, wherein the transaction further comprises a third portion, and the mechanism further comprises a third ECC code.

7. The mechanism of claim 1, wherein the first ECC code is a single error correction-double error detection (SEC-DED) code.

8. A method for protecting a transaction in a computer system by using a multiple error correcting code scheme, comprising:
   applying a first ECC code to a first portion of the transaction;
   applying a second ECC code to a second portion of the transaction;
   transmitting the transaction; and
   decoding the first and the second ECC codes, wherein the first portion of the transaction is a header packet, wherein the second portion of the transaction comprises one or more data packets and wherein all of the data packets do not require an associated ECC code.

9. The method of claim 8, wherein the second ECC code is one of a SEG-DED code and a code that detects a wire failure.

10. The method of claim 8, wherein the transaction further comprises a third portion, and the mechanism further comprises a third ECC code.

11. The method of claim 8, wherein the first ECC code is a single error correction-double error detection (SEC-DED) code.

12. The method of claim 8, wherein the second portion of the transaction comprises one or more data packets.

13. The method of claim 12, wherein the second ECC code is contained in a last data packet of the one or more data packets.

14. The method of claim 12, wherein the second ECC code comprises a plurality of parity bits and one or more remaining ECC bits, wherein each data packet of the one or more data packets includes one parity bit of the plurality of parity bits, and wherein a last data packet of the one or more data packets includes the one or more remaining data bits.

15. The method of claim 8, further comprising:
   defining all transactions and an amount of information to be protected;
   defining interconnect widths and packet sizes; and
   determining a desired ECC capability.

16. The method of claim 15, further comprising:
   listing all frequently-used, multiple packet transactions;
   determining a smallest transaction form the list; and
   determining if an alternative ECC may be used with the smallest transaction.

17. The method of claim 16, further comprising:
   if the alternative ECC may be used, encoding all listed transactions using the alternative ECC; and
   if the alternative ECC may not be used:
   removing from the list, all transactions whose size equals that of the smallest transaction, and repeating the process until the list is empty.

18. A multiple error correcting code (ECC) mechanism for use with transactions in a computer system, comprising:
   an ECC encoder, the ECC encoder applying a first ECC code to a first portion of a transaction and a second ECC code to a second portion of the transaction; and
   a decoder that decodes the first and the second ECC codes, wherein the first portion of the transaction precede the second portion of the second transaction and wherein the second portion of the transaction comprises a plurality of data packet segments and wherein all of the data packet segments do not require an associated ECC code.

* * * * *